US012061435B2

(12) United States Patent
Hirabayashi

(10) Patent No.: US 12,061,435 B2
(45) Date of Patent: Aug. 13, 2024

(54) IMAGE FORMING APPARATUS INCLUDING PRE-EXPOSURE UNIT HAVING LIGHT EMITTING ELEMENTS OF DIFFERENT DIRECTIONAL CHARACTERISTICS

(71) Applicant: CANON KABUSHIKI KAISHA, Tokyo (JP)

(72) Inventor: Jun Hirabayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/884,461

(22) Filed: Aug. 9, 2022

(65) Prior Publication Data

US 2023/0082013 A1 Mar. 16, 2023

(30) Foreign Application Priority Data

Sep. 16, 2021 (JP) ................................ 2021-150835

(51) Int. Cl.
*G03G 21/08* (2006.01)
*G03G 15/043* (2006.01)
*G03G 15/02* (2006.01)
*G03G 15/06* (2006.01)
*G03G 15/16* (2006.01)

(52) U.S. Cl.
CPC ........... *G03G 21/08* (2013.01); *G03G 15/043* (2013.01); *G03G 15/0216* (2013.01); *G03G 15/0266* (2013.01); *G03G 15/065* (2013.01); *G03G 15/1675* (2013.01); *G03G 2215/025* (2013.01)

(58) Field of Classification Search
None
See application file for complete search history.

(56) References Cited

U.S. PATENT DOCUMENTS

| | | | | |
|---|---|---|---|---|
| 4,728,982 | A * | 3/1988 | Takemura | G03G 15/047 355/70 |
| 7,848,678 | B2 * | 12/2010 | Shibata | G03G 21/08 399/128 |
| 9,880,488 | B2 * | 1/2018 | Mori | G03G 21/08 |
| 2012/0201561 | A1 | 8/2012 | Kubo | 399/89 |
| 2017/0010556 | A1 | 1/2017 | Noguchi et al. | G03G 15/02 |

FOREIGN PATENT DOCUMENTS

| | | |
|---|---|---|
| JP | 2006-235034 | 9/2006 |
| JP | 2010-160185 | 7/2010 |
| JP | 2011-123438 | 6/2011 |
| JP | 2012-163601 | 8/2012 |
| JP | 2017-021208 | 1/2017 |

* cited by examiner

*Primary Examiner* — Arlene Heredia
(74) *Attorney, Agent, or Firm* — Venable LLP

(57) ABSTRACT

An image forming apparatus includes a rotatable photosensitive member, a charging member, an exposure unit, a developing member, a transfer member, and a pre-exposure unit. The pre-exposure unit exposes a surface of the photosensitive member after the toner image is transferred to the recording material and before being charged by the charging member. The pre-exposure unit includes a substrate disposed adjacent to one end of the photosensitive member with respect to a longitudinal direction of the photosensitive member, and in which a first light emitting element and a second light emitting element having directional characteristics narrower than that of the first light emitting element are mounted.

4 Claims, 7 Drawing Sheets

(b)

(a)

| | 10mm | 20mm | 30mm | 40mm | 50mm | 60mm | 70mm | 80mm | 90mm | 100mm | 110mm | 120mm | 130mm | 140mm | 150mm |
|---|---|---|---|---|---|---|---|---|---|---|---|---|---|---|---|
| LED1 | 12mW | 16mW | 14mW | 16mW | 26mW | 29mW | 27mW | 22mW | 17mW | 12mW | 9mW | 6mW | 5mW | 3mW | 3mW |
| LED2 | 6mW | 17mW | 8mW | 6mW | 8mW | 8mW | 7mW | 5mW | 5mW | 8mW | 24mW | 31mW | 23mW | 18mW | 15mW |
| TOTAL | 21mW | 35mW | 27mW | 21mW | 33mW | 38mW | 34mW | 28mW | 22mW | 20mW | 32mW | 36mW | 27mW | 21mW | 17mW |

IMAGE FORMING APPARATUS INCLUDING PRE-EXPOSURE UNIT HAVING LIGHT EMITTING ELEMENTS OF DIFFERENT DIRECTIONAL CHARACTERISTICS

FIELD OF THE INVENTION

This invention relates to an image forming apparatus such as a laser printer with an electrophotographic method.

DESCRIPTION OF THE RELATED ART

Recently, a light emitting diode (hereinafter, referred as an LED) has been popularized as a small and inexpensive light source and used not only for a display device but for lighting or functional parts in many products. For example, the LED is used for a fluorescent light, a backlight of a liquid crystal display, a light which lightens an original in an image reading device such as a scanner, or a discharging lamp (hereinafter referred as a pre-exposing unit) in the image forming apparatus. A pre-exposing unit is a device which reduces surface potential of a photosensitive drum and emits a light to execute to pre-expose to make surface potential even after a toner image formed on the photosensitive drum is transferred onto a recording material in an image-forming unit in the image forming apparatus such as a laser printer. For example, in Japanese Laid-Open Patent Application (JP-A) 2012-163601, an example of the method to light emitting from the pre-exposing unit onto the photosensitive drum is disclosed. In JP-A 2012-163601, a constitution composes that a light is projected by the LED from an end of a light guide located along with the photosensitive drum in a longitudinal direction, and the photosensitive drum in the longitudinal direction is evenly exposed by reflecting a projected light at a gap in the light guide is suggested. Also, for example in Japanese Laid-Open Patent Application (JP-A) 2010-160185, instead of providing the light guide, a constitution composes that the LED is provided at each end of the photosensitive drum in the longitudinal direction and a light is projected onto the photosensitive drum is disclosed.

However, the light guide provided in the pre-exposing unit in JP-A 2012-163601 described above is expensive. Also, the constitution in JP-A 2010-160185 described above needs to be provides LEDs on both ends of the photosensitive drum in the longitudinal direction. Therefore, substrates which LEDs mounted on both sides, signals drive the LEDs from/to a control unit configures to control LEDs, and signal cables which is a bundle of wire supplying an electric source voltage are necessary. At least one of two signal cables which is connect with the control unit and two substrates needs to be longer enough. The longer cable increases cost and the work time in assembling process as well.

A conventional pre-expose unit does not include a diagnosing function for the LED as the light source and is not able to detect malfunction of the LED. Printing on a recording material is possible without emitting LED on the photosensitive drum even when the LED is out of order. Therefore, it is hard for a user who uses the image forming apparatus to notice any malfunction of the LED. However, in case of that the pre-exposing unit does not work and a charge on the photosensitive drum is not reduced, a phenomenon of 'overlap' that an image formed on the photosensitive drum in a previous round dimly overlaps on the image formed in a next round happens. As a result, deterioration of image quality is seen obviously in printing that matters quality of the image such as photo-printing.

SUMMARY OF THE INVENTION

In the above situation, an objective of the present invention is to configure the reliable pre-exposing with cutting cost.

To solve the problem described above, this disclosure includes constitutions below.

According to an aspect of the present invention, there is provided an image forming apparatus comprising, a rotatable photosensitive member, a charging member configured to charge the photosensitive member, an exposure unit configured to emit light to expose the photosensitive member charged by the charging member and to form a latent image, a developing member configured to develop the latent image with tone, a transfer member configured to transfer a toner image developed and formed by the developing member to a recording material, and a pre-exposure unit configured to expose a surface of the photosensitive member after the toner image is transferred to the recording material and before being charged by the charging member, wherein the pre-exposure unit includes a substrate disposed adjacent to one end of the photosensitive member with respect to a longitudinal direction of the photosensitive member, and in which a first light emitting element and a second light emitting element having directional characteristics narrower than that of the first light emitting element are mounted.

According to an aspect of the present invention, there is provided an image forming apparatus comprising: a rotatable photosensitive member, a charging member configured to charge the photosensitive member, an exposure unit configured to emit light to expose the photosensitive member charged by the charging member and to form a latent image, a developing member configured to develop the latent image with tone, a transfer member configured to transfer a toner image developed and formed by the developing member to a recording material, a pre-exposure unit configured to expose a surface of the photosensitive member after the toner image is transferred to the recording material and before being charged by the charging member, and a controller configured to control the pre-exposure unit, wherein the pre-exposure unit includes a first substrate disposed adjacent to one end of the photosensitive member with respect to a longitudinal direction of the photosensitive member and in which a first light emitting element emits the surface of the photosensitive member from one end side of the photosensitive member toward the vicinity of the center of the photosensitive member with respect to the longitudinal direction is mounted, and a second substrate disposed adjacent to the other end of the photosensitive member and in which a second light emitting element emits the surface of the photosensitive member from the other end side of the photosensitive member toward the vicinity of the center of the photosensitive member with respect to the longitudinal direction is mounted, and wherein the controller controls the first light emitting element and the second light emitting element to emit the light, detects an electromotive voltage generated by the second light emitting element when the second light emitting element receives the light emitted by the first light emitting element or an electromotive voltage generated by the first light emitting element when the first light emitting element receives the light emitted by the second light emitting element, and determines presence or absence of the first light emitting element and the second light emitting element based on the detected electromotive voltage.

Further feature of the present invention will become apparent from the following description of exemplary embodiments with reference to the attached drawings.

DESCRIPTION OF THE EMBODIMENTS

The embodiments of the present invention will be described in detail with referring the drawings as follows.

[Constitution of the Image Forming Apparatus]

Figure 1:
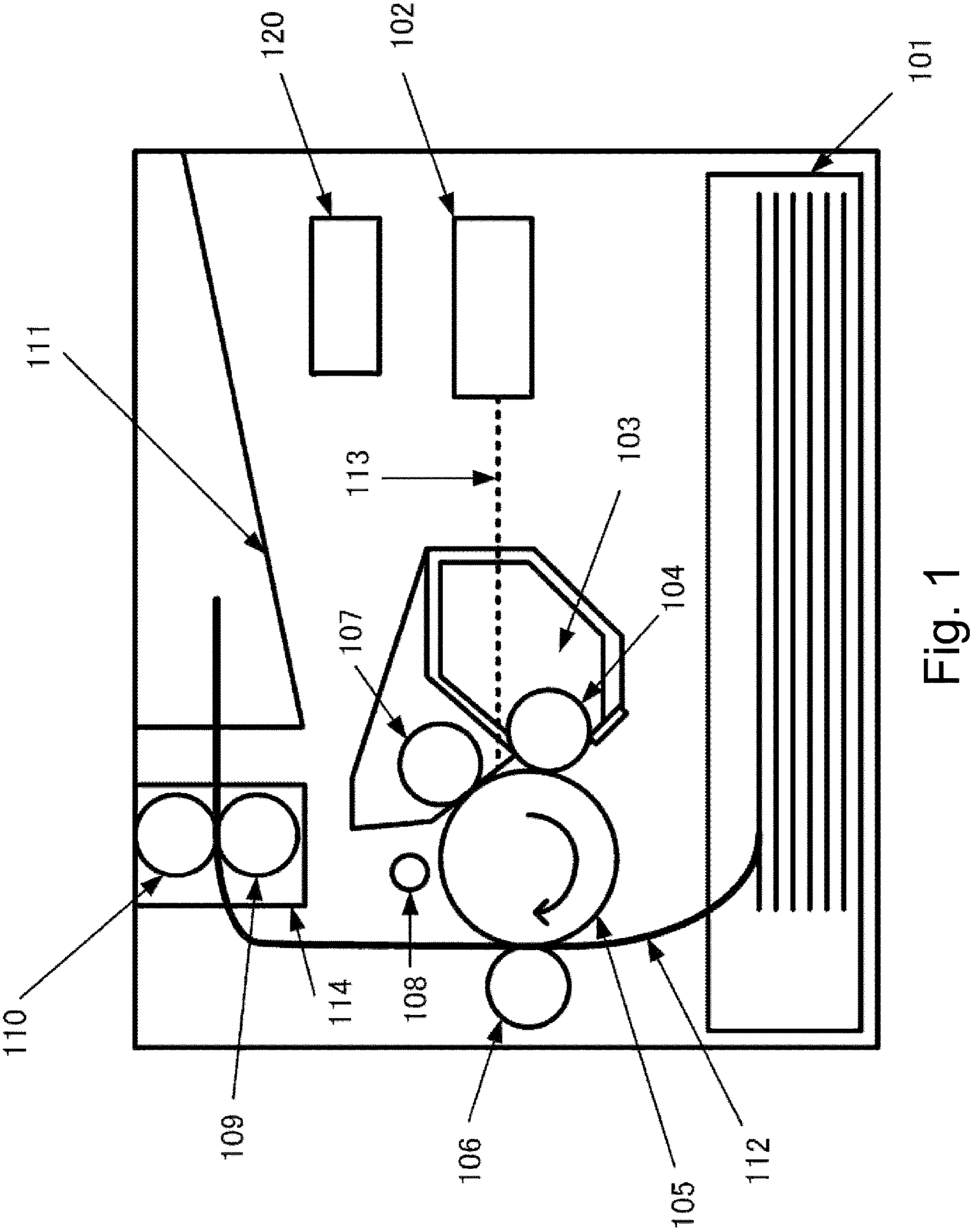
FIG. 1 is a cross sectional view of a constitution of an image forming apparatus according to embodiments 1 and 2.

FIG. 1 is a cross sectional view for explaining a constitution of a monochrome laser printer 100 (hereinafter referred as a printer 100) which is the image forming apparatus applied the embodiment 1. In FIG. 1, an image forming unit that forms an image on a recording material includes a photosensitive drum 105 which is a photosensitive member and a charging roller 107 which is a charging member charges the photosensitive drum 105 with potential evenly. Also the image forming unit includes a laser scanner 102 as an exposing means for forming a latent image by emitting a laser light 113 on the surface of the photosensitive drum 105. Further, the image forming unit includes a developing roller 104 as a developing means for developing the latent image formed on the photosensitive drum 105 by a magnetic toner stored in a toner tank 103 and forming a toner image. On the rotational direction of the photosensitive drum 105, in the upper course of the charging roller 107 the surface of the photosensitive drum 105 is exposed (pre-exposing) to spread potential evenly by a pre-exposing unit 108 provided in the lower course of the transfer roller 106. A control unit 120 controls the image forming unit (etc.) in order for the printer 100 to execute its movement to form an image.

A paper feeding portion 101 stores and feeds the recording material to a feeding passage 112 and the fed recording material is fed to the transfer roller 106 through the feeding route 112. The transfer roller 106 as a transfer means for transferring the toner image formed on the photosensitive drum 105 onto the recording material. A fixing unit 114 is a component to fix the toner image transferred on the recording material includes a fixing roller 109 which heats up the toner image and a press roller 110 which presses on the recording material passing through by making contact on the fixing roller 109. In a discharge portion 111 the recording material passed through the fixing unit comes out and is stacked up.

[Image Forming Movement]

Next, the image forming operation of the printer 100 will be described. The control unit 120 of the printer 100 starts each motor in the apparatus to drive and the laser scanner 102 to drive at the same time when the control unit receives a command of a printing job from an outer device such as a personal computer (not showing). The charging roller 107 is applied a charging voltage which is high voltage with a negative potential, makes contact on the photosensitive drum 105 which rotates to the direction of an arrow (clockwise) in the drawing, and charges evenly on the surface of the photosensitive drum 105. The laser scanner 102 emits the laser light 113 according to an image data included by the printing job. The laser light 113 emitted from the laser scanner 102 and is exposed on the photosensitive drum 105. An area exposed by the laser light 113 on the photosensitive drum 105 loses an electric charge and then a latent image is formed. The developing roller 104 includes a magnet inside and the magnet draws the magnetic toner in the toner tank 103 by applying a developing charge with a high negative polarity from a voltage source (not showing). Therefore, the developing roller 104 transfers a toner onto the latent image with an electrostatic power on the surface of the photosensitive drum 105 and forms a toner image.

On the other hand, the recording material fed from the paper feeding portion 101 by a command from the control unit 120 passes through the feeding passage 112 and is fed to a nipping area formed by the contact of the transfer roller 106 and the photosensitive drum 105. The transfer roller 106 transfers the toner image formed on the photosensitive drum 105 onto the recording material when the transfer roller 106 is applied a transfer voltage which is a high positive polarity from a voltage source (not showing). The recording material on which the toner image transferred is fed to the fixing unit 114 and then fed to a fixing/nipping portion formed by the contact of the fixing roller 109 and the pressing roller 110. In the fixing/nipping portion by the fixing roller 109 heating the toner image up to several hundred degrees and the pressing roller 110 pressing the toner image at the same time, the toner image is fixed on the recording material. The recording material fixed the toner image comes out and is stacked up in the discharge portion 111. After transferring the toner image onto the recording material is completed, the potential on the surface of the photosensitive drum 105 is uneven by the image forming. Therefore, the pre-exposing unit 108 reduces the charge and the potential of the surface of the photosensitive drum 105 down to almost 0 v evenly by exposing a light emitted from an LED as a light source (not showing) on the surface of the photosensitive drum 105. Thereby, the image which has formed on the photosensitive drum 105 and transferred on the recording material before does not affect the image formed in the next round. The printer 100 executes a printing job as repeating the image forming operation described above.

[Constitution of the Pre-Exposing Unit]

Figure 2:
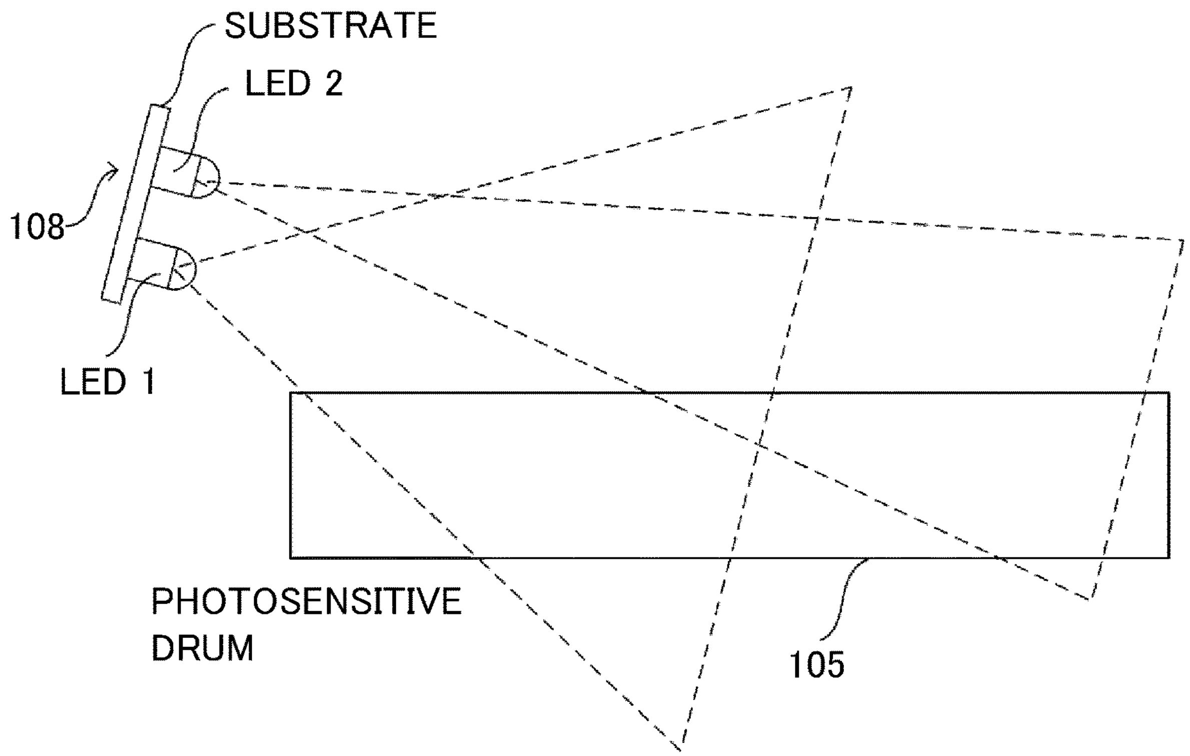
FIG. 2 is an explanatory drawing of a constitution of a pre-exposing unit according to the embodiment 1.

Next, pre-exposing unit 108 in the present embodiment will be described. FIG. 2 is a schematic diagram describing a constitution of the pre-exposing unit 108 in the present embodiment. As FIG. 2 shows, in the pre-exposing unit 108 in the present embodiment two LEDs as a light emitting element are mounted on only one substrate which is different constitution from the conventional pre-exposing unit as described earlier. Also, in the conventional example of the pre-exposing unit as described earlier the light emitted from the LED in the pre-exposing unit is exposed on the photosensitive drum through the light guide. On the other hand, in the pre-exposing unit 108 in the present embodiment the light emitted from the two LEDs are exposed on the photosensitive drum 105 directly without the light guide. Thus, the pre-exposing 108 is located as tilting toward the photosensitive drum 105 vertically above the one end of the photosensitive drum 105 with respect to the longitudinal direction in order the light emitted from LEDs to expose on the whole surface of the photosensitive drum 105 in the longitudinal direction as FIG. 2 shows. Among an LED 1 and an LED 2 mounted on the substrate, the LED 1 is located at the lower side and the LED 2 at the upper side and aligned in the vertical direction (upper and lower direction in the drawing as well). Also, FIG. 2 indicates an area with a broken line where the light emitted from the LED 1 and the LED 2 reaches, and the areas the light emitted from each LED reaches are different. As FIG. 2 shows, the light emitted from the LED 1 (a first emitting element) exposes the area from the end where the pre-exposing unit 108 is located of the longitudinal side of the photosensitive drum 105 to the vicinity of the center. On the other hand, the light emitted from the LED 2 (a second emitting element) exposes the area from the vicinity of this center of the photosensitive drum 105 to the opposite side where the pre-exposing unit 108 is located of the longitudinal side of the photosensitive drum 105.

[Directional Characteristics of LED]

Figure 3:
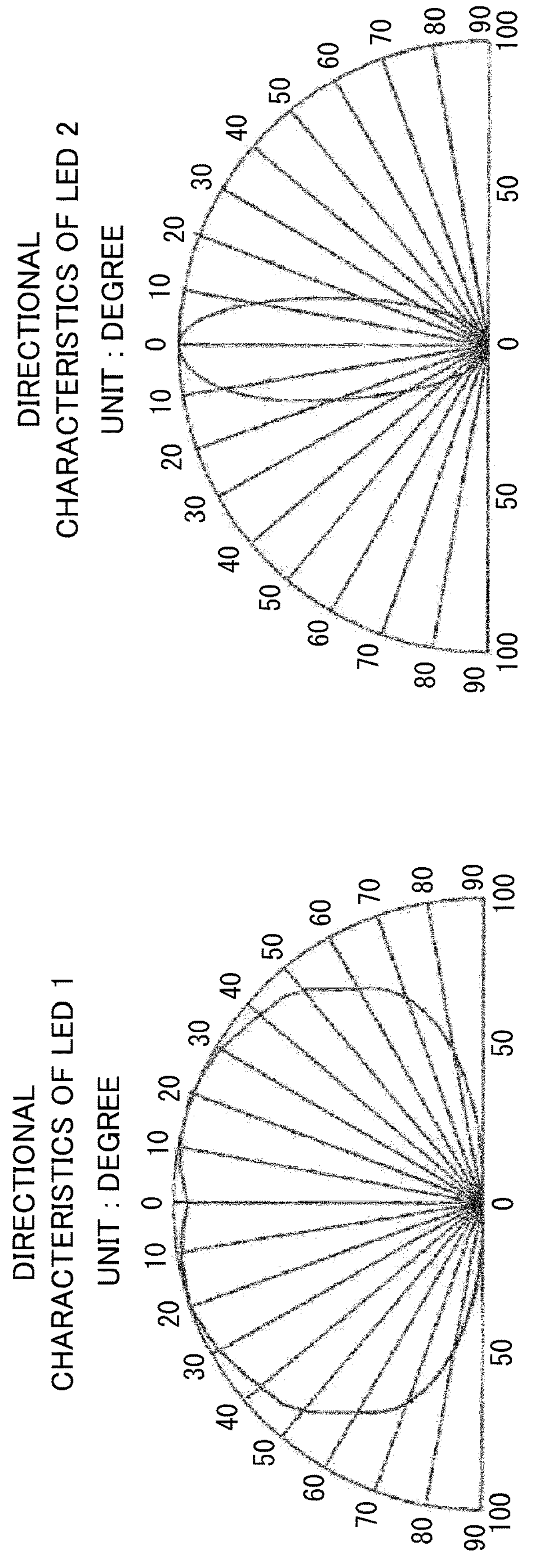
FIG. 3, part (a) and part (b), is an explanatory graph of directional characteristics of a LED according to the embodiment 1.

As described above, the LED 1 and the LED 2 includes each different directional characteristic. FIG. 3 is a graph showing the directional characteristic of the LED 1 and the LED 2. FIG. 3(*a*) shows the directional characteristic of the LED 1 and FIG. 3(*b*) shows the directional characteristic of the LED 2. The graphs in FIG. 3 indicate the expanse of the light emitted from the LEDs by a relative brightness (a relative luminous intensity) at each degree and the directional characteristic of each LED is drawn in the semicircular graph. In the graph of the directional characteristics the numbers 0, 10, . . . 90 on the perimeter of the semicircular graph indicate the angle of the light emitted from the LED (unit: degree) and the numbers 0, 50, 100 on the straight line as the diameter of the semicircular graph indicate the relative luminous intensity (unit: %). The graphs of the directional characteristics show how much brightness decreases relatively when the brightness of the brightest part (angle) is 100% of the relative luminous intensity as the angle of the light emitted from the LED increases. As FIG. 3 shows, the LED 1 includes the wider directional (wide-angle directional) and the LED 2 includes the narrower (acute) directional (narrow-angle directional). In other words, the light emitted from the LED 1 is able to lighten wider and closer area around the substrate the LED 1 mounted but not able to lighten the further area, on the other hand, the light emitted from the LED 2 is able to lighten further and narrower area but not able to lighten the closer area widely around the substrate the LED 2 mounted. Therefore, by mounting both the LED 1 and the LED 2 which include different directional characteristics on the same substrate, the LED 1 is able to lighten the area from the end of the photosensitive drum 105 in the longitudinal direction where the pre-exposing unit is located to the vicinity of the center of the photosensitive drum 105 and the LED 2 is able to lighten the area from the vicinity of the center of the photosensitive drum 105 in the longitudinal direction to the other end opposite to the end where the pre-exposing unit 108 is located. As a result, by exposing the light on the photosensitive drum 105 from the LED 1 and the LED 2, the photosensitive drum 105 is able to be discharged.

[Discharging the Photosensitive Drum with Pre-Exposing Unit]

Figure 4:
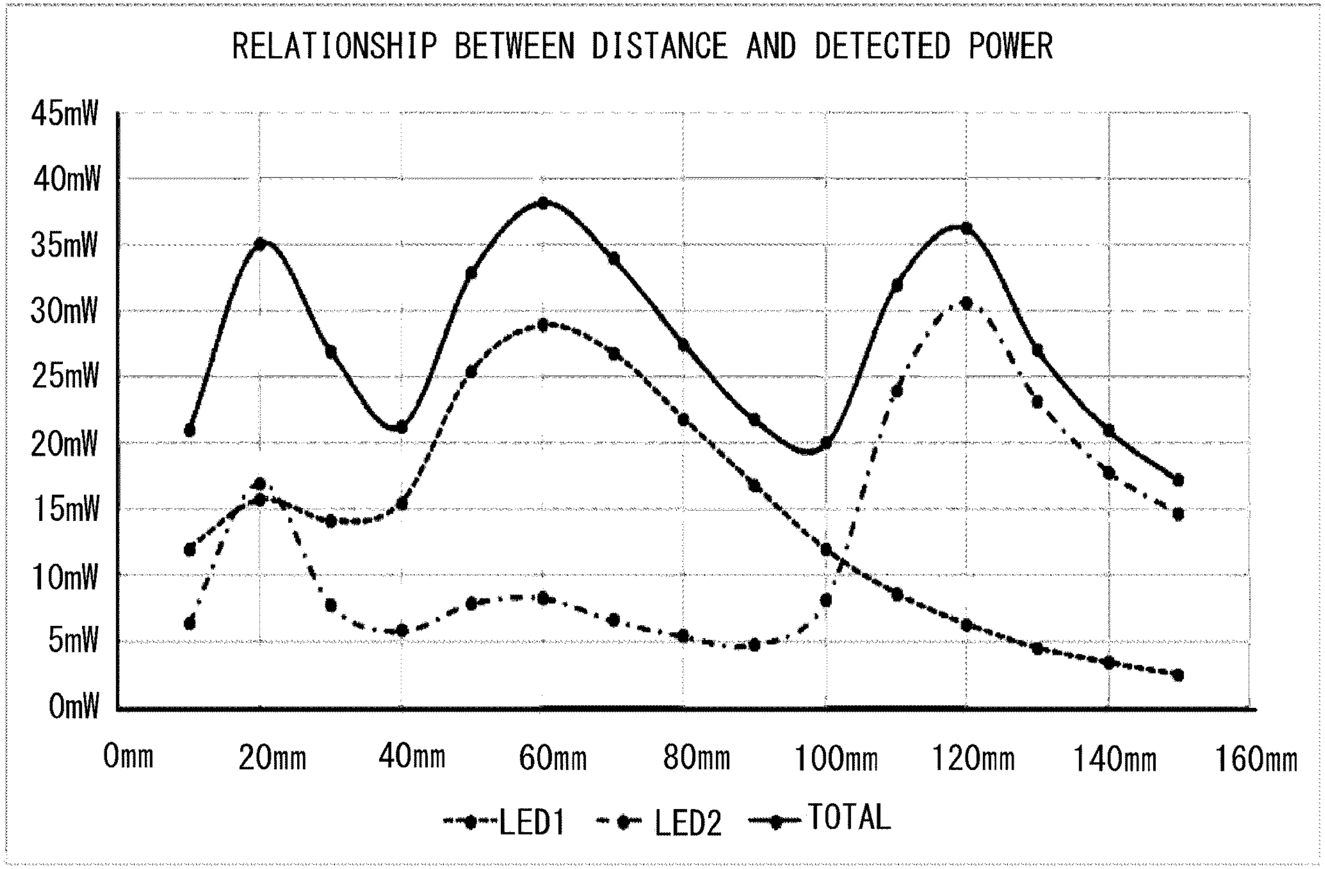
FIG. 4 are a table and a graph indicate experimental results according to the embodiment 1.

FIG. 4 includes a table (upper in FIG. 4) obtains results of a detected electric power (emission intensity) of the light emitted from the LED 1 and the LED 2 measured with a light intensity meter when the pre-exposing unit 108 composes the constitution which described in FIG. 2 is applied practically and a graph (lower in FIG. 4) made on the basis of the data shown in the table. The table shown in the upper side in FIG. 4 indicates, from top to bottom, a distance from the LED (unit: mm), a detected electric power of the LED 1 (unit: mW), a detected electric power of the LED 2 (unit: mW), and the sum of the detected electric power of the LED 1 and LED 2 (unit: mW). In the table the results measured at every 10 mm distance from the LED between 10 mm and 150 mm about the detected power of the LED 1, the detected power of the LED 2, and the sum of the detected power of the LED 1 and the LED 2 are shown.

Also, the graph shown in the lower side in FIG. 4 is made based on the values of the distance and the detected power (emitting intensity) of the LED 1 and the LED 2 of the table above in FIG. 4. In the graph of FIG. 4 a horizontal axis indicates a distance from the LED (unit: mm) and a vertical axis indicates a detected power (unit: mW). A dotted line in the graph indicates the detected power of the LED 1 which the directional angle is wide, and a dot/dash chain line indicates the detected power of the LED 2 which the directional angle is narrow. Also, a solid line in the graph indicates the sum of the detected power of the LED 1 and the LED 2 at each distance.

As FIG. 4 shows, the detected power of the light emitted from the LED 1 becomes the maximum at the distance of 60 mm which is the vicinity of the center of the photosensitive drum 105 in the longitudinal direction and the detected power of the light emitted from the LED 2 becomes the maximum at the distance of 120 mm on the photosensitive drum 105 in the longitudinal direction. The solid line graph that indicates the sum of the detected power of the LED 1 and the LED 2 is wavy but shows the lights including the detected power (emitting intensity) always keeps more than 20 mW until the distance of 140 mm from the light source (LED) are exposed. Waving of the solid line graph is not a problem because the residual charge on the photosensitive drum 105 can be discharged as far as the pre-exposing unit keeps emitting the light including greater than the fixed emitting intensity (for example, 20 mW). As FIG. 4 showing, the detected power is less than 20 mW at some distance with the single LED only out of the LED 1 or LED 2. For example, the detected power of the LED 1 is less than 20 mW at distance between 10 mm and 40 mm, and between 90 mm and 150 mm. Similarly, the detected power of the LED 2 is less than 20 mW at distance between 10 mm and 100 mm, and at 120 mm and at 150 mm.

However, by aligning the LED 1 and the LED 2 vertically (in up and down direction), each emitting the light in different directional angles allow the detected power to be greater than 20 mW and expose the photosensitive drum 105 to the light from one end to the other end in the longitudinal direction. As mentioned earlier, in the present embodiment reducing down to one substrate that the LEDs are mounted on and not using the light guide make cutting cost possible. At the same time, reducing down to one substrate allows to cut work time to assemble and to reduce the risk of malfunction to be more reliable as compared with providing two substrates.

As described above, according to the present embodiment, the reliable pre-exposing is possible with the lower cost.

In the embodiment 2 a diagnostic method to check if an LED provided in a pre-exposing unit will be described.

[Constitution of the Pre-Exposing Unit]

Figure 5:
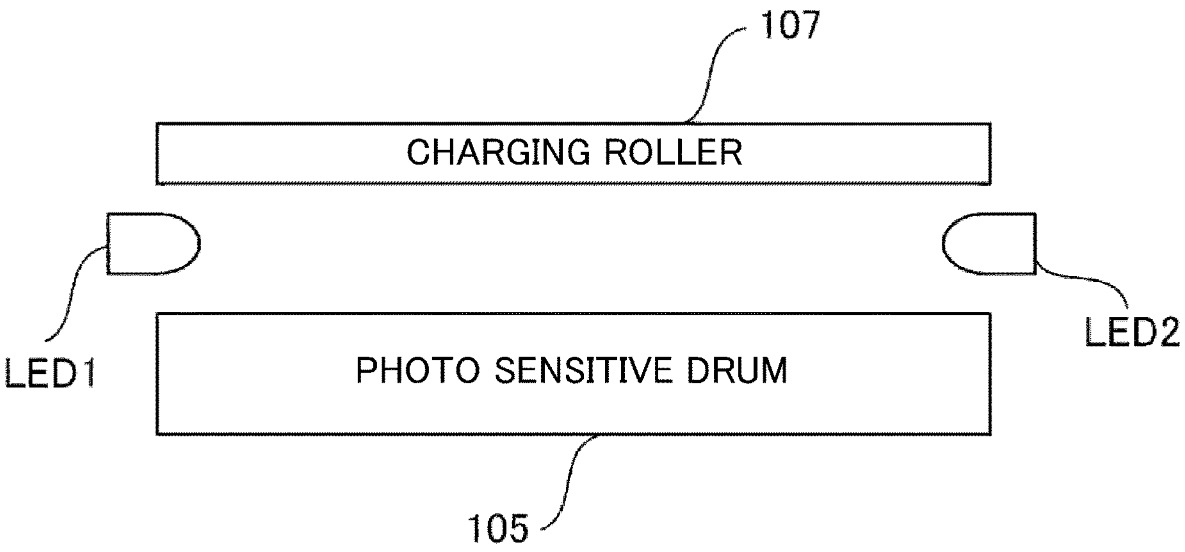
FIG. 5 is an explanatory drawing of a constitution of a pre-exposing unit according to the embodiment 2.

FIG. 5 is a schematic diagram showing positional relations of the pre-exposing unit, the photosensitive drum 105, and the charging roller 107 in the embodiment 2. Note that, an LED 1 and an LED 2 in FIG. 5 are LEDs in the pre-exposing unit mounted on substrates provided at the vicinity of each end the photosensitive drum 105 in the longitudinal direction. The pre-exposing unit in the present embodiment applies a method that a light for pre-exposing is exposed from around both ends of the photosensitive drum 105 in the longitudinal direction without a light guide in JP-A 2010-160185 as described earlier. In detail, the photosensitive drum 105 is discharged by the LED 1 exposing a left half and the LED 2 exposing a right half of the photosensitive drum 105 in the longitudinal direction in the drawing. Note that in the present embodiment the constitution of the pre-exposing unit is described with the constitution provides LEDs at the vicinity of both ends of the photosensitive drum 105 in the longitudinal direction.

An LED (light emitting diode) which is a light source of the pre-exposing unit is a light emitting element in which a PN junction of a semiconductor is exposed outside. By applying an electric current between a cathode terminal and an anode terminal of the LED the PN junction emits, and a light is exposed outside. A solar battery is similar as the LED at the point of that the PN junction is exposed outside. When a light is exposed on the LED emitting portion (PN junction), an electric current is applied between the anode terminal and the cathode terminal, and then a voltage is generated. As a matter of course, an electromotive voltage of the LED is much lower compared with the solar battery because the PN junction of the LED is configured to emit effectively when the electric current is applied. However, it is possible to generate a few voltages according to an intensity and an output impedance of the light exposed on the emitting portion of the LED.

[Diagnosis of the Pre-Exposing Unit]

The two LEDs of the pre-exposing unit in the present embodiment are located with facing each other on both ends of the longitudinal side of the photosensitive drum 105. When the LEDs are used as the pre-exposing unit, the light from LEDs is exposed on the photosensitive drum 105 to discharge the photosensitive drum 105 with lighting up two LEDs. Also, it is possible to diagnose any malfunction of the LED based on if the electromotive voltage generated when one LED lit up to lighten another LED using a characteristic which the electric voltage is generated by the LED being exposed with the light. A function which diagnoses if the LED has any malfunction will be described below.

The LED in the pre-exposing unit is controlled by a CPU (Central Processing Unit) 121 (referred in FIG. 6) which is a control means of a control unit 120 shown in FIG. 1. The CPU 121 includes a pre-exposing mode which uses the pre-exposing unit for discharging the photosensitive drum 105 and a diagnosing mode which diagnoses if the LED in the pre-exposing unit has any malfunction as mentioned above. The CPU 121 controls both LED 1 and LED 2 to light on in the pre-exposing mode and controls LED 1 to light up when the LED 2 receives a light as a light receiving portion in order to measure an electromotive voltage generated by the LED 2 in the diagnosing mode. Since the LED 1 and LED 2 are located as facing each other, the LED 2 generates an electromotive voltage by receiving the light from the LED 1 when the LED 2 works normally. For example, in the case of the LED 1 has any malfunction, the light from the LED 1 does not emit and the LED 2 does not generate the electromotive voltage. Thus, the malfunction in the LED 1 is able to be detected if LED 2 works normally. Similarly, the LED 2 lights on to the LED 1 which receives as a light receiving portion and the electromotive voltage generated by the LED 1 is measured. The LED 1 generates an electromotive voltage by receiving the light from the LED 2 when the LED 1 works normally. For example, in the case of the LED 2 has any malfunction, the light from the LED 2 does not emit and the LED 1 does not generate the electromotive voltage. Thus, the malfunction in the LED 2 is able to be detected if LED 1 works normally.

[Constitution of the Control Unit]

Figure 6:
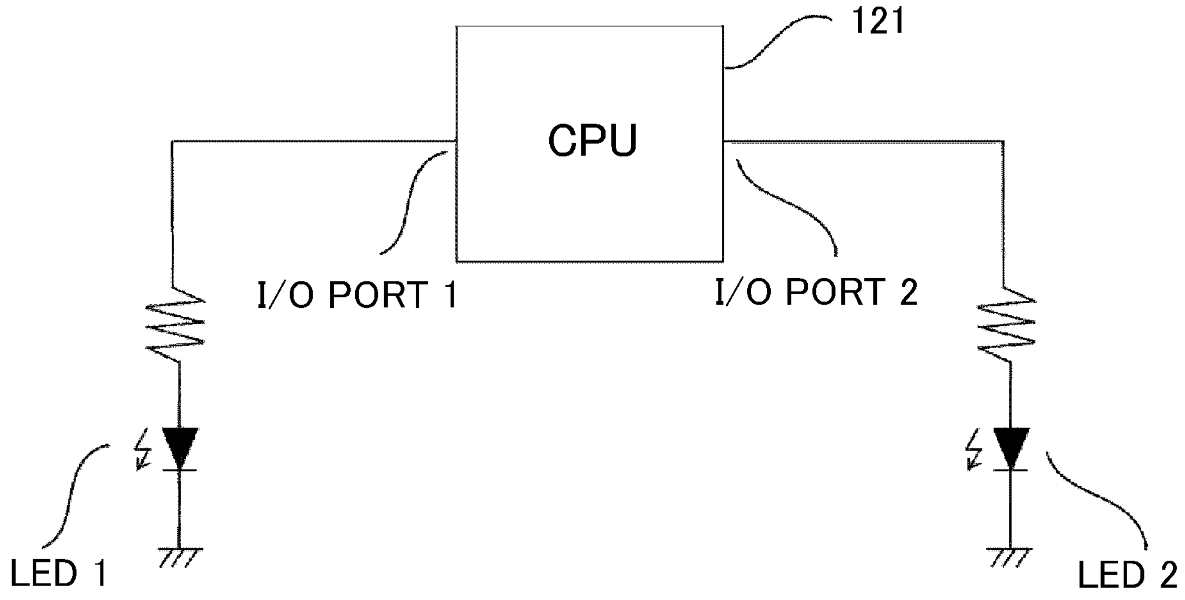
FIG. 6 is an explanatory drawing of a connection between the pre exposing unit and a control unit according to the embodiment 2.

FIG. 6 shows a connection relation of the CPU 121 the LED 1, and the LED 2 described above. The LED 1 is connected with an I/O port1 of the CPU 121 by the anode terminal through a resistance and connected to the ground (grounded) by the cathode terminal. On the other hand, the LED 2 is connected with an I/O port2 of the CPU 121 by the anode terminal through a resistance and connected to the ground (grounded) by the cathode terminal. The LED 1 and the LED 2 are connected with different input/output ports (I/O port1, I/O port2). Also, the I/O port1 connected with the LED 1 and the I/O port2 connected with the LED 2 need to detect the electromotive voltage the LED 1 or LED 2 generates to diagnose if there is malfunction of the LEDs as described above. Accordingly, the I/O port 1 connected with the LED 1 and the I/O port 2 connected with the LED 2 need to include an A/D conversion function (Analog/Digital conversion) converts a voltage signal which is an analog input signal into a digital value. Note that, in the case that the LED 1 and LED 2 is used for the pre-exposing unit, the I/O port 1 connected with the LED 1 and the I/O port 2 connected with the LED 2 are switched into output ports by the CPU 121. For example, the I/O port 1 and I/O port 2 output a high voltage signal when the LED 1 and the LED 2 turn on the light, and the I/O port 1 and I/O port 2 output a low voltage signal when the LED 1 and the LED 2 turn off the light.

[Control of the Diagnose Function]

Figure 7:
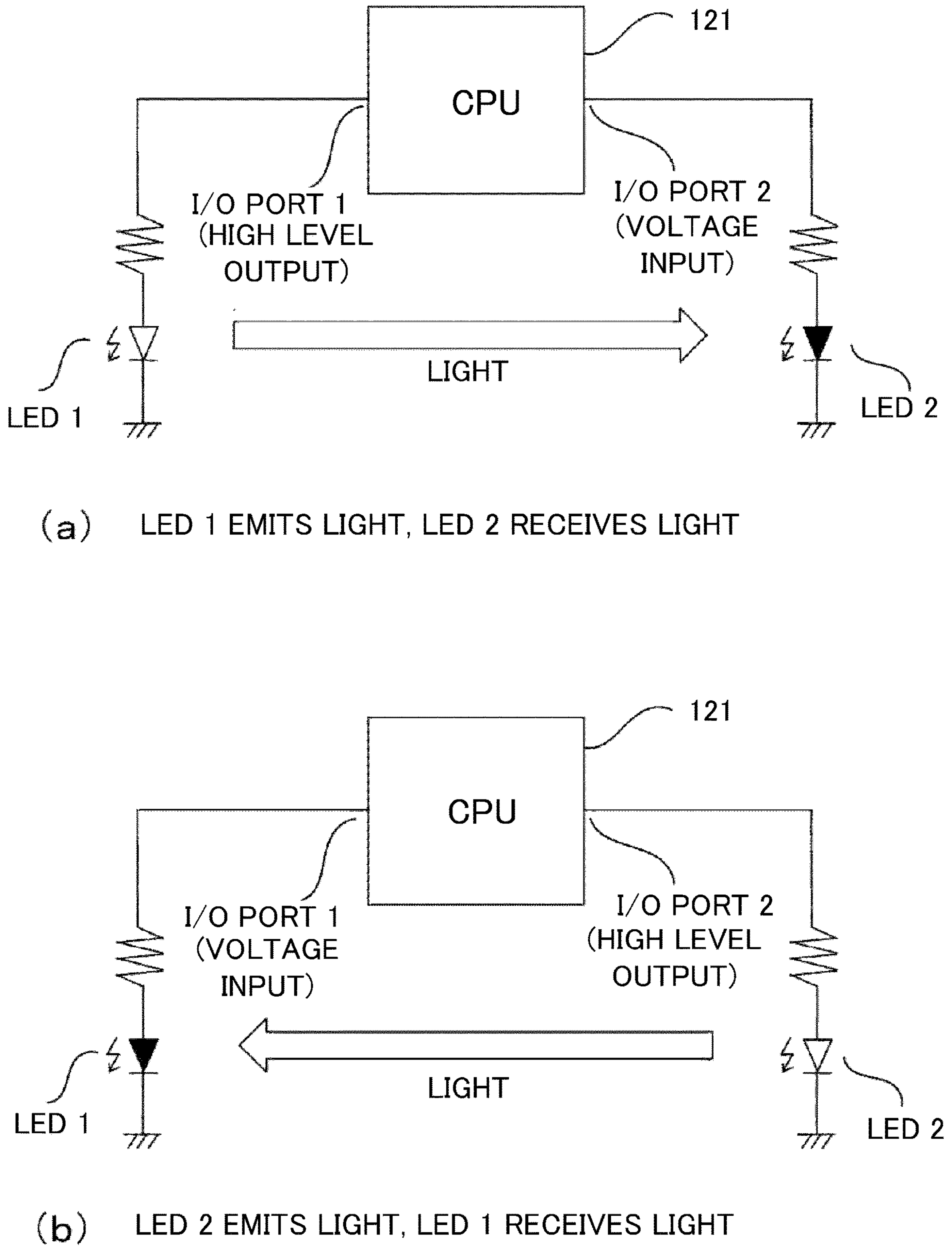
FIG. 7, part (a) and part (b), is an explanatory drawing of a process of the control unit according to the embodiment 2.

Next, a control process of the CPU 121 when the diagnose function is executed will be described. FIG. 7(*a*) describes the control process to diagnose if the LED 1 has any malfunction. In the case of diagnosing if the LED 1 has any malfunction, the CPU 121 switches the I/O port 1 connected with the LED 1 into the output port and switches the I/O port 2 connected with the LED 2 into the input port which includes the A/D conversion function. The CPU 121 output a high voltage signal from the I/O port connected to the LED 1 to turn on the light of the LED 1. The LED 1 is in the conduction state and turns on the light by the high voltage signal being input to the anode terminal of the LED 1. On the other hand, the light emitted from the LED 1 enters to the LED 2 and the LED 2 is in the conduction state. Therefore, an electric current flows in resistance connected to the anode terminal of the LED 2 and the voltage signal is input to the I/O port 2 connected with the LED 2. And then, the CPU 121 determines if the electromotive voltage generated by the LED 2 is greater than a fixed value based on a digital value which the input voltage signal A/D converted. When the electromotive voltage is greater than the fixed value, The CPU 121 determines the LED 1 lights on and works normally. Meanwhile, when the LED 1 does not turn on with any malfunction, no light emitted from the LED 1, no light enters to the LED 2, and no electromotive voltage generated by the LED 2. Therefore, the CPU 121 determined the LED 1 does not light on and does not work normally, because the electromotive voltage is less than the fixed value. Note that, the fixed value mentioned above may be determined by a result of a practical experiment.

Also, for example, if an output voltage from the LED 2 is high enough such as a few V, the A/D conversion function is not necessary in the I/O ports. Thus, the I/O ports without the A/D conversion function may be used. The reason the I/O ports with A/D conversion function are used in the present embodiment will be described as follows. The output voltage from an LED is most likely to be too low originally to be recognized enough high above a threshold level of the I/O port input the signal i.e., a threshold level of the input signal from a TTL or a CMOS. On the other hand, the I/O port with the A/D conversion function is able to fix the threshold level as a constitution of the pre-exposing unit needs because it is possible for the I/O port with the A/D conversion function to fix the threshold level adjustably.

FIG. 7(*b*) describes the control process to diagnose if the LED 2 has any malfunction. In the case of diagnosing if the LED 2 has any malfunction, the CPU 121 switches the I/O port 2 connected with the LED 2 into the output port and switches the I/O port 1 connected with the LED 1 into the input port which includes the A/D conversion function. The control process of the CPU 121 to diagnose if the LED 2 has any malfunction is same as FIG. 7(*a*) described above and the description is omitted here. The CPU 121 is able to confirm presence or non-presence of malfunction of the LEDs in the pre-exposing unit by diagnosing the LED 1 and the LED 2 based on the process described in FIG. 7(*a*) and FIG. 7(*b*) while not in printing process. As a result, the pre-exposing unit becomes more reliable.

As described above, pre-exposing can be more reliable and cut cost according to the present embodiment.

While the present invention has been described with reference to exemplary embodiments, it is to be understood that the invention is not limited to the disclosed exemplary embodiments. The scope of the following claims is to be accorded the broadest interpretation so as to encompass all such modification, equivalent structures, and functions.

This application claims the benefit of Japanese Patent Application No. 2021-150835, filed Sep. 16, 2021, which is hereby incorporated by reference herein in its entirety.

What is claimed is:

1. An image forming apparatus comprising:

a rotatable photosensitive member;

a charging member configured to charge the photosensitive member;

an exposure unit configured to emit light to expose the photosensitive member charged by the charging member and to form a latent image;

a developing member configured to develop the latent image with tone;

a transfer member configured to transfer a toner image developed and formed by the developing member to a recording material; and a pre-exposure unit configured to expose a surface of the photosensitive member after the toner image is transferred to the recording material and before being charged by the charging member, wherein the pre-exposure unit includes a substrate disposed adjacent to one end of the photosensitive member with respect to a longitudinal direction of the photosensitive member, and in which a first light emitting element and a second light emitting element having directional characteristics narrower than that of the first light emitting element are mounted.

2. An image forming apparatus according to claim 1, wherein the first light emitting element emits the surface of the photosensitive member from one end side of the photosensitive member on which the substrate is disposed toward the vicinity of the center of the photosensitive member with respect to the longitudinal direction, and wherein the second light emitting element emits the surface of the photosensitive member from the vicinity of the center of the photosensitive member with respect to the longitudinal direction toward the other end of the photosensitive member.

3. An image forming apparatus according to claim 2, further comprising a controller configured to control the pre-exposure unit, wherein the controller controls the first light emitting element and the second light emitting element to emit the light and expose the surface of the photosensitive member.

4. An image forming apparatus according to claim 1, wherein the first light emitting element and the second light emitting element each include a light emitting diode.

* * * * *